US006539474B2

(12) United States Patent
Matsuura

(10) Patent No.: US 6,539,474 B2
(45) Date of Patent: Mar. 25, 2003

(54) SYSTEM AND METHOD FOR SELECTIVELY EXECUTING DIFFERENT BOOT ROUTINES DEPENDING ON WHETHER AN ERROR IS DETECTED

(75) Inventor: Yoko Matsuura, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/782,854

(22) Filed: Feb. 14, 2001

(65) Prior Publication Data
US 2001/0020263 A1 Sep. 6, 2001

Related U.S. Application Data

(63) Continuation of application No. 09/155,618, filed as application No. PCT/JP98/00358 on Jan. 29, 1998, now abandoned.

(30) Foreign Application Priority Data

Jan. 31, 1997 (JP) .............................. 9-018076

(51) Int. Cl.[7] .................. G06F 9/445; G06F 11/20; G06F 11/30; G06F 12/00; G06F 13/00
(52) U.S. Cl. .............. 713/2; 711/5; 711/103; 711/165; 711/166; 714/5
(58) Field of Search ............... 711/103, 5, 165, 711/166, 162; 713/1, 2; 714/5, 6

(56) References Cited

U.S. PATENT DOCUMENTS

| 5,268,928 A | * 12/1993 | Herh et al. .................. 375/222 |
| 5,367,571 A | 11/1994 | Bowen et al. .............. 380/242 |
| 5,432,927 A | 7/1995 | Grote et al. .................. 713/2 |
| 5,440,632 A | 8/1995 | Bacon et al. ................ 380/242 |
| 5,467,286 A | 11/1995 | Pyle et al. .................. 702/62 |
| 5,522,076 A | 5/1996 | Dewa et al. ................... 713/2 |
| 5,568,641 A | 10/1996 | Nelson et al. ................. 713/2 |
| 5,701,492 A | 12/1997 | Wadsworth ................. 711/103 |
| 5,712,969 A | 1/1998 | Zimmermann et al. ........ 714/5 |
| 5,805,882 A | 9/1998 | Cooper et al. ................. 713/2 |
| 5,835,761 A | * 11/1998 | Ishii et al. .................. 713/100 |
| 5,852,735 A | 12/1998 | Urban ........................ 717/171 |
| 5,901,330 A | 5/1999 | Sun et al. ................... 711/103 |
| 5,949,997 A | 9/1999 | Smith ............................ 713/2 |
| 6,182,187 B1 | * 1/2001 | Cox et al. ...................... 711/5 |

FOREIGN PATENT DOCUMENTS

EP 0 698 847 A1 8/1995
EP 0 723 372 A2 7/1996

OTHER PUBLICATIONS

Abstract of JP, 8–69376, A (Hitachi, Ltd., Hitachi Keiyo Engineering K.K.), Mar. 12, 1996.
Abstract of JP, 8–195952, A (Sony Corp.), Jul. 30, 1996.
Abstract of WO, 95/08824, A1 (Robert Bosch GmbH.), Mar. 30, 1995.
Abstract of JP, 3–158184, A (Juki Corp.), Jul. 8, 1991.
Abstract of JP, 5–197559, A (NEC Corp.), Aug. 6, 1993.
Abstract of JP, 7–261997, A (Fanuc Ltd.), Oct. 13, 1995.

* cited by examiner

Primary Examiner—Glenn Gossage
(74) Attorney, Agent, or Firm—Lerner, David, Littenberg, Krumholz & Mentlik, LLP

(57) ABSTRACT

An information processing apparatus includes a rewritable non-volatile memory with first and second areas for storing a boot program, a central processing unit (CPU), a downloader for downloading a new boot program from outside the information processing apparatus, and a status monitoring circuit. The status monitoring circuit includes a status memory for periodically storing a boot selecting signal, which may change in response to a detected error. The status monitoring circuit generates a reset signal for rebooting if an error is detected and also selects a boot address, which indicates whether the first or second memory area should be used for the reboot in response to the boot selecting signal.

9 Claims, 8 Drawing Sheets

SYSTEM AND METHOD FOR SELECTIVELY EXECUTING DIFFERENT BOOT ROUTINES DEPENDING ON WHETHER AN ERROR IS DETECTED

The present application claims benefit and is a continuation of U.S. patent application Ser. No. 09/155,618 filed Sep. 29, 1998, now abandoned, which is a 371 of PCT/JP98/00358, international filing date Jan. 29, 1998.

TECHNICAL FIELD

The invention relates to an information processing apparatus and method and, more particularly, to an information processing apparatus and method for rewriting a basic program which is executed upon activation of the apparatus and an application program which is executed in accordance with the basic program.

BACKGROUND ART

In association with the progress of a recent semiconductor technique, a microcomputer is applied to various electronic equipment. For example, the microcomputer is applied to an IRD (Integrated Receiver Decoder). IRD's have become widespread in recent years and may serve as a receiver in a broadcasting system for broadcasting programs or the like via a satellite.

In such a field, the possibility that services to be provided will be changed in the future is strong. It is thus necessary to design an apparatus (for example, the IRD) so that a program of the microcomputer can be changed in correspondence to the change.

The programs of the microcomputer are classified as a basic program having routines such as a boot routine and the like for executing a basic process and an application program for actually providing services.

The applicant has already proposed such an apparatus for changing (updating) the application program in, for example, JP-A-8-195952 (1996).

In case of changing both the basic program and the application program, when a new basic program and application program are directly written into a memory area in which an original basic program and application program have been stored, a non-normal state where the basic program having a boot routine or the like is not normally stored is caused when an error, power failure, or the like occurs during the writing of the basic program, so that it is difficult to activate the apparatus next time. Consequently, two storing units are provided for a rewritable non-volatile memory such as an EEPROM (Electrically Erasable and Programmable Read Only Memory) and, when the programs are updated, either one of the storing units is alternately used every updating.

In this manner, even when the error, power failure, or the like occurs during the writing of the programs, since the original basic program has been preserved, the next activation can be performed.

However, if two storing units are provided as mentioned above, it is necessary that the rewritable non-volatile memory have at least a capacity equal to the basic program in order to preserve the basic program. So, there is a problem that this makes it difficult to reduce the costs of the apparatus.

SUMMARY OF THE INVENTION

The invention is made in consideration of such a situation and intends to make it possible to update programs without providing two rewritable non-volatile memories.

According to the invention, there is provided an information processing apparatus comprising:
storing means in which at least two memory areas have been preset;
means for obtaining a new basic program from the outside; and
executing means for executing an application program stored in the storing means in accordance with a basic program stored in the storing means,
characterized in that the executing means allows a new basic program obtained to be stored into the memory area that is not used for writing the basic program in at least the two memory areas of the storing means.

According to another aspect of the invention, there is provided an information processing method comprising the steps of:
storing a basic program into one of at least two preset memory areas and executing a stored application program in accordance with the stored basic program; and
allowing a new basic program obtained from outside the memory areas to be stored into the other memory area that is not used for writing the basic program in at least the two memory areas.

According to yet another aspect of the invention, there is provided an information processing apparatus comprising:
storing means in which at least two memory areas to store a basic program have been preset and an application program is stored;
means for obtaining a new basic program and a new application program from the outside; and
executing means for executing the application program stored in the storing means in accordance with the basic program stored in the storing means;
characterized in that the executing means allows the obtained new basic program to be stored into the memory area that is not used for writing the basic program in at least the two memory areas of the storing means and, after that, allows the new application program to be stored into an area other than the area in which the new basic program has been stored.

According to a further aspect of the invention, there is provided an information processing method comprising the steps of:
storing a basic program into one of at least two memory areas which have been preset and executing a stored application program-in accordance with the stored basic program; and
storing a new basic program obtained from the outside into the other memory area that is not used to write the basic program in at least the two memory areas of storing means and, after that, storing a new application program obtained from the outside into the area other than the area in which the new basic program has been stored.

When the new basic program is stored into the storing means, the executing means allows the basic program to be stored into the memory area that is not used to write the basic program before. Therefore, it is possible to rewrite the basic program without any problem.

In another embodiment,the newly obtained basic program is stored into the memory area that is not used to write the, basic program before and the newly obtained application program is written into the area other than the area in which the new basic program has been stored, so that the basic program and the application program can be stored into the storing means without any problem.

BRIEF DESCRIPTION OF DRAWINGS

FIG. 3 3A–3G are timing charts exemplifying the operation of the system monitoring circuit.

BEST MODE FOR CARRYING OUT THE INVENTION

Figure 1:
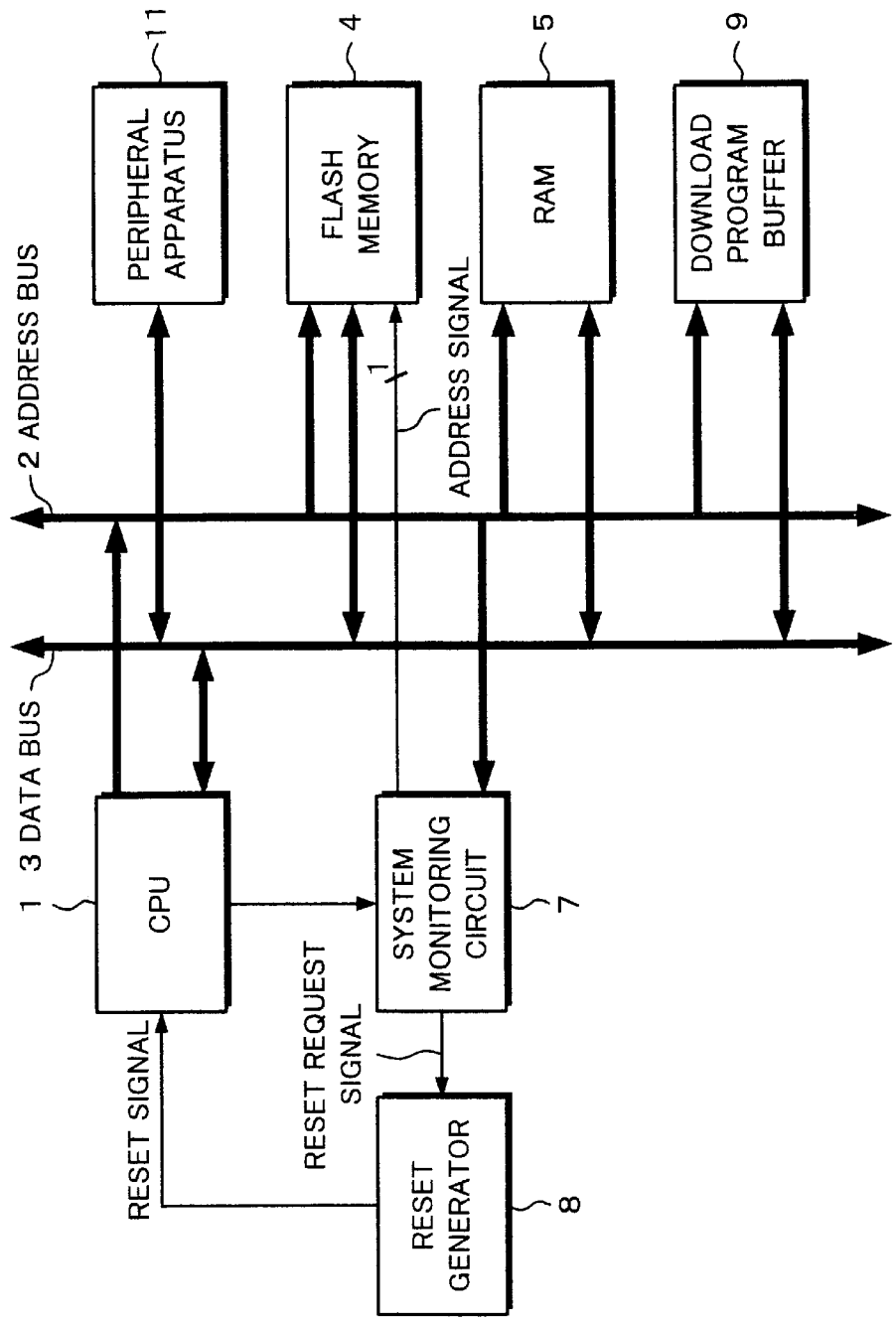
FIG. 1 is a block diagram showing an embodiment of an information processing apparatus of the invention.

FIG. 1 shows a construction of an embodiment of an information processing apparatus of the invention. A CPU 1 (executing means) operates in accordance with a program (basic program or application program) stored in a flash memory 4 (storing means) or a random access memory (RAM) 5 (second storing means), supplies address information via an address bus 2, and transmits or receives data corresponding to its address to/from each circuit via a data bus 3.

The flash memory 4 is a rewritable non-volatile memory and stores a basic program such as a boot routine or the like which is executed upon activation into a physical sector (first memory area) corresponding to a logical sector 0. Flash memory also stores an application program which is executed in accordance with the basic program into a physical sector (second memory area) corresponding to logical sectors 1 to (N−1), where N indicates the number of sectors. The logical sectors are used 1when the CPU 1 uses them for addressing (which will be described later).

The RAM 5 temporarily stores the program or data during processing by the CPU 1.

A system monitoring circuit 7 monitors whether a download of a new basic program or an application program has been successful or not and monitors various states such as where the basic program has been stored in the flash memory 4 and the like (which will be explained herein later).

When a reset request signal is supplied from the system monitoring circuit 7, a reset generator 8 outputs a reset signal to the CPU1.

A download program buffer 9 is constructed by, for example, a semiconductor memory such as RAM or the like and temporarily stores a new program which is supplied by a peripheral apparatus 11.

The peripheral apparatus 11 receives a new program which is supplied via a predetermined medium or a transmission path (not shown). As an example of the peripheral apparatus, there is a receiving unit (antenna, filter, tuner, demodulator, error correcting circuit, or the like) of a digital television broadcasting system such as a digital broadcasting sattellite or digital ground wave broadcasting station. A program is a program that is necessary for the operation of the IRD.

Figure 2:
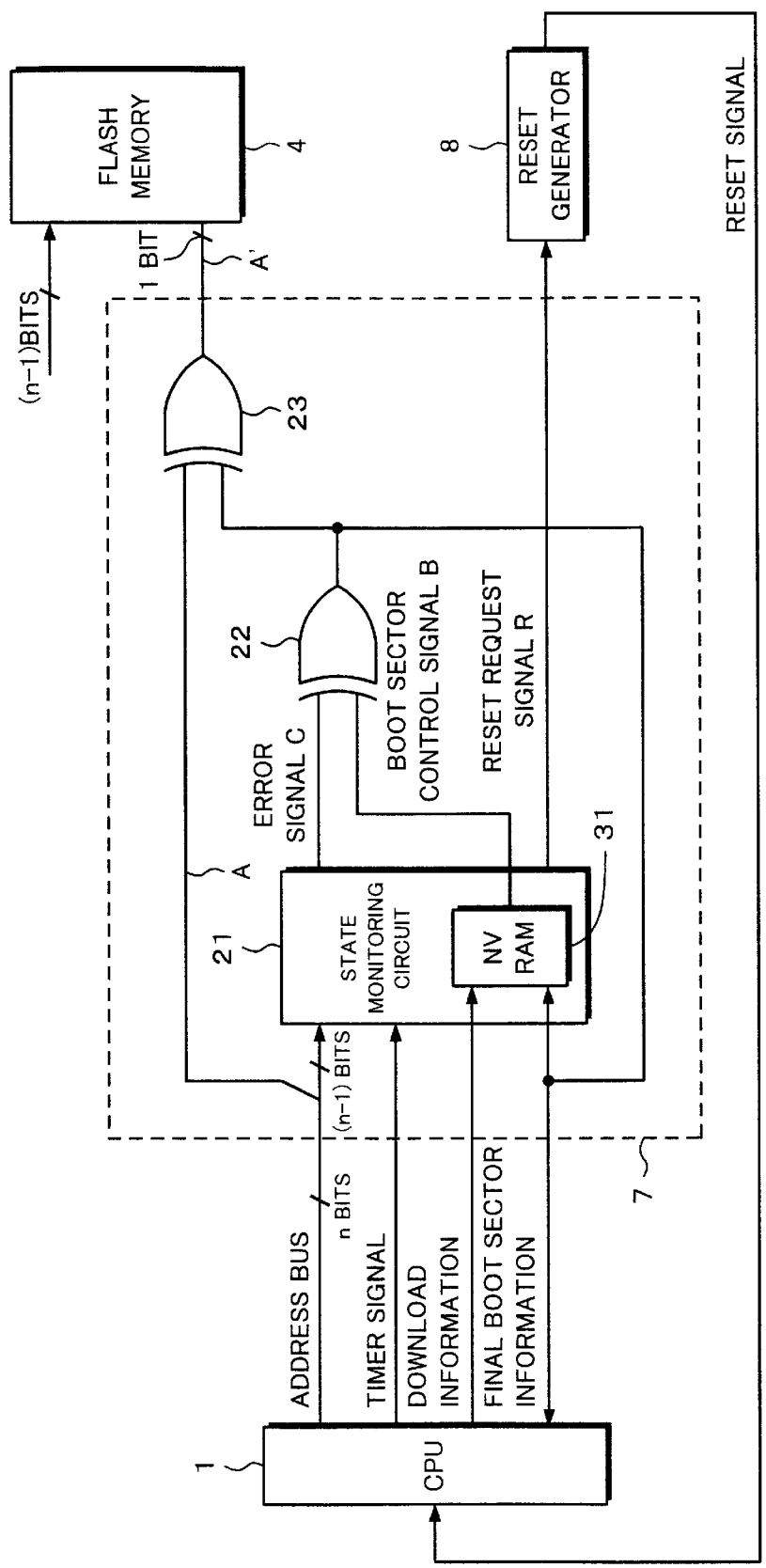
FIG. 2 is a block diagram showing a constructional example of a system monitoring circuit in FIG. 1.

FIG. 2 shows a constructional example of the system monitoring circuit 7. A timer signal and download information are supplied from the CPU 1 to a state monitoring circuit 21 and an address signal of (n−1) bits in an address bus signal of n bits is also supplied. A boot sector control signal B and an error signal C outputted from the state monitoring circuit 21 are supplied to an XOR (exclusive OR) circuit 22. A signal which is outputted from the XOR circuit 22 is supplied to one input of an XOR circuit 23 and is also supplied to a non-volatile RAM (NVRAM) 31 built in the state monitoring circuit 21.and the CPU 1. In the address bus (n bits) which is supplied from the CPU 1, a predetermined address signal A of one bit is supplied to another input of the XOR circuit 23. An address signal A' which is outputted from the XOR circuit 23 is supplied to the flash memory 4 together with the address bus signal of (n−1) bits. Further, a reset request signal R outputted from the state monitoring circuit 21 is supplied to the reset generator 8. The reset signal outputted from the reset generator 8 is supplied to the CPU 1.

In the information processing apparatus in the invention, a plurality of locations are provided as a memory location where the basic program which is executed when the system is activated is stored in the flash memory 4. When all of the programs in the flash memory 4 are downloaded and rewritten, the basic program is stored at a location different from the location where the basic program used for the operation so far has been stored. With this construction, even if an error occurs during the download of the basic program and the download fails, since the basic program that can be surely normally activated remains, it is prevented that a state occurs where the system cannot be activated due to the failure of the download.

For simplicity of explanation, description will now be made hereinbelow with respect to a case where the flash memory 4 has 0 to 31 sectors and two sectors (physical sectors 0 and 16) in which the basic program can be stored are provided in the flash memory 4. The invention, however, is not limited to those numerical values.

Figure 3:
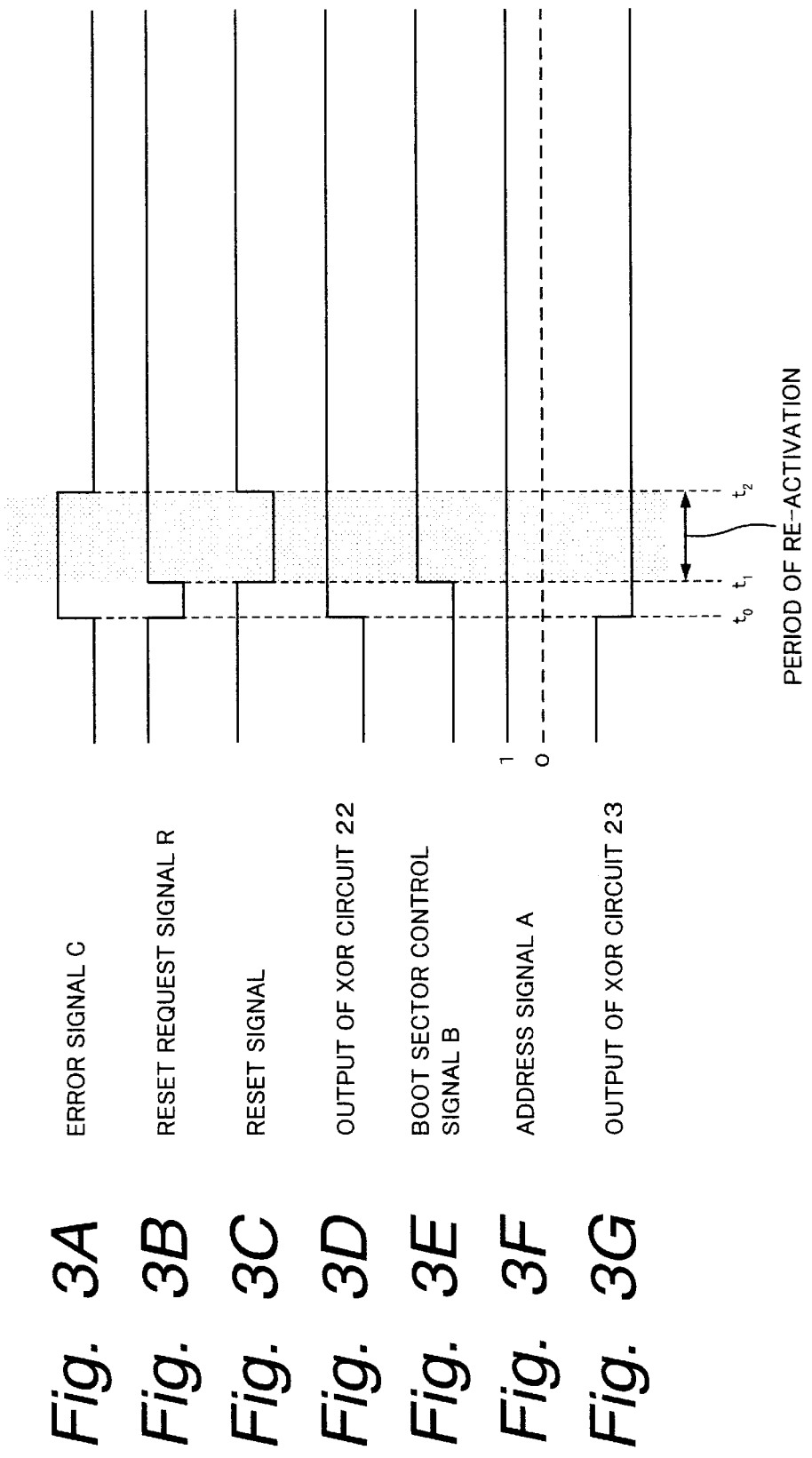

The operation when a power source of the system monitoring circuit 7 is turned on will now be explained with reference to FIG. 2 mentioned above and a timing chart of FIG. 3.

The state monitoring circuit 21 allows the built-in NVRAM 31 to periodically store a value of the signal outputted from the XOR circuit 22, so that the state (high level or low level) of the signal outputted from the XOR circuit 22 just before the power source of the information processing apparatus such as a receiver or the like is turned off can be stored.

When the power source is turned on, the state monitoring circuit 21 reads out an output (final boot sector information) of the XOR circuit 22 which has been stored in the built-in NVRAM 31 and is generated just before the power source is turned off at the time of the preceding activation, and this output is supplied to the XOR circuit 22. The state monitoring circuit 21 also discriminates a state of the CPU 1 from the address information of (n−1) bits and a timer signal which are supplied from the CPU 1. If it is determined that the CPU is in an erroneous state, the circuit 21 outputs a high level signal as an error signal C to the XOR Circuit 22 (FIG. 3A). Further, when the erroneous state is detected, the state monitoring circuit 21 outputs the reset request signal R to the reset request generator 8 (FIG. 3B).

When it is assumed that a low level signal has been stored in the NVRAM 31, the output of the XOR circuit 22 becomes the low level signal, unless the error signal C is generated, and the low level signal is outputted to the XOR circuit 23.

In this instance, when the basic program is downloaded at the time of the preceding activation and the download fails, naturally, the CPU 1 is not normally activated and the state monitoring circuit 21 detects such a state and outputs the high level signal as an error signal C to the XOR circuit 22 as mentioned above. Consequently, the output of the XOR circuit 22 is inverted to the high level (FIG. 3D) and the high level signal is stored in the NVRAM 31 at a timing just before timing t1. The state monitoring circuit 21 outputs the error signal C and simultaneously outputs the reset request signal to the reset generator 8. The reset generator 8 generates the reset signal (FIG. 3C) at timing t1 in response to the reset request signal, so that the whole system is reactivated (mesh or dotted portion in FIG. 3C). When the reactivation is executed, the high level signal stored in the NVRAM 31 is supplied as a boot sector control signal B (FIG. 3E) to the XOR circuit 22 and no error signal is generated, so that the output of the XOR circuit 22 becomes the high level signal (FIG. 3D) and is supplied to the XOR circuit 23. Since the address signal A (FIG. 3F) of one bit which is supplied from the CPU 1 before the error occurs has the same value as that after completion of the reactivation, the address signal A' as an output of the XOR circuit 23 before the error occurs is inverted after completion of the reactivation.

In this manner, the address which is accessed in the flash memory 4 is switched and the system is reactivated by the preserved basic program irrespective of the failure of the download.

The operation after completion of the turn-on of the power source of the information processing apparatus of FIG. 1 will now be explained with reference to the flowcharts of FIGS. 4 and 5. In the following explanation, although description will be made with respect to a case where the basic program has been stored in the physical sector 0, the apparatus can also similarly operate when the basic program has been stored in the physical sector 16.

Figure 4:
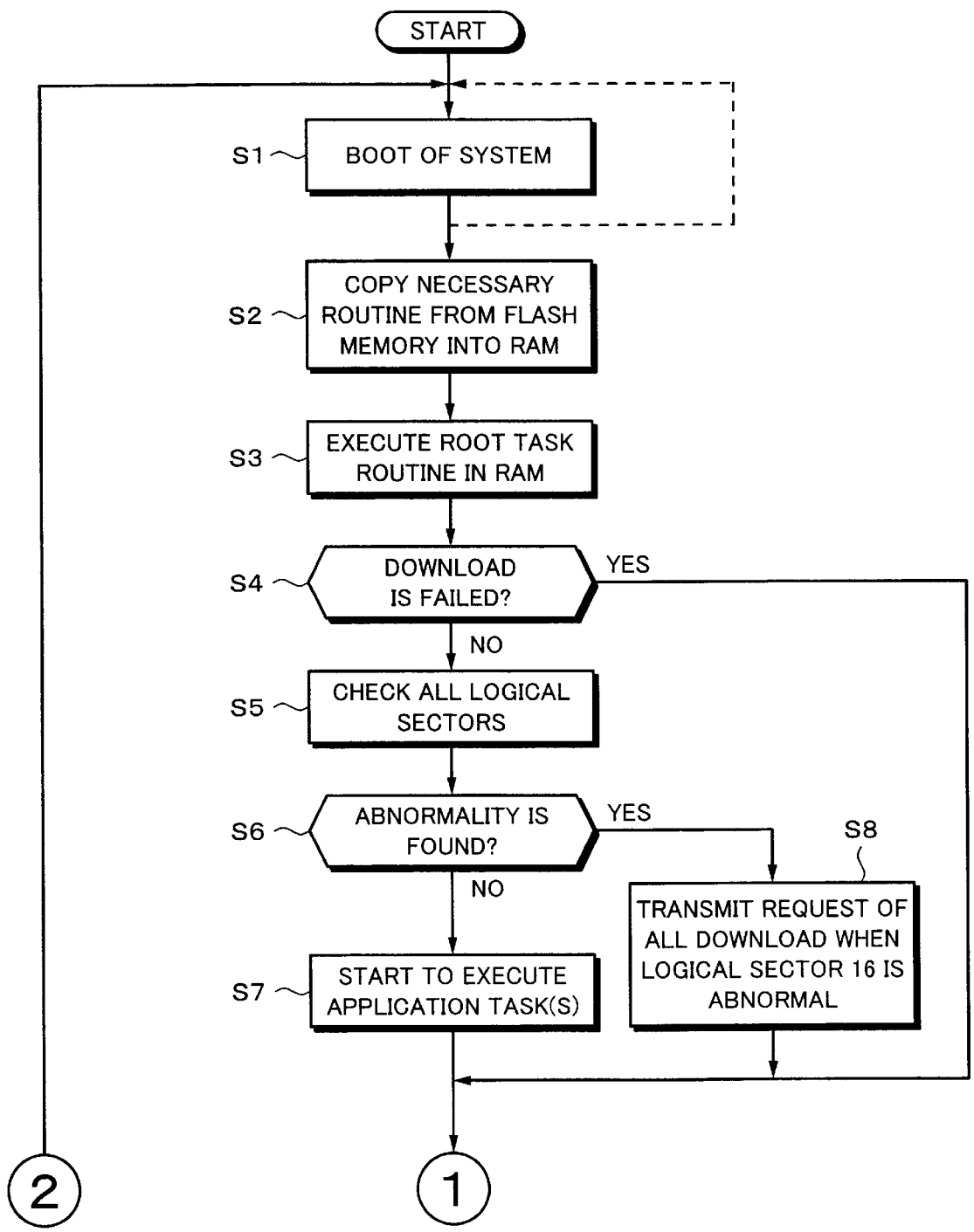
FIG. 4 is a flowchart of the operation of the information processing apparatus of FIG. 1.
Figure 5:
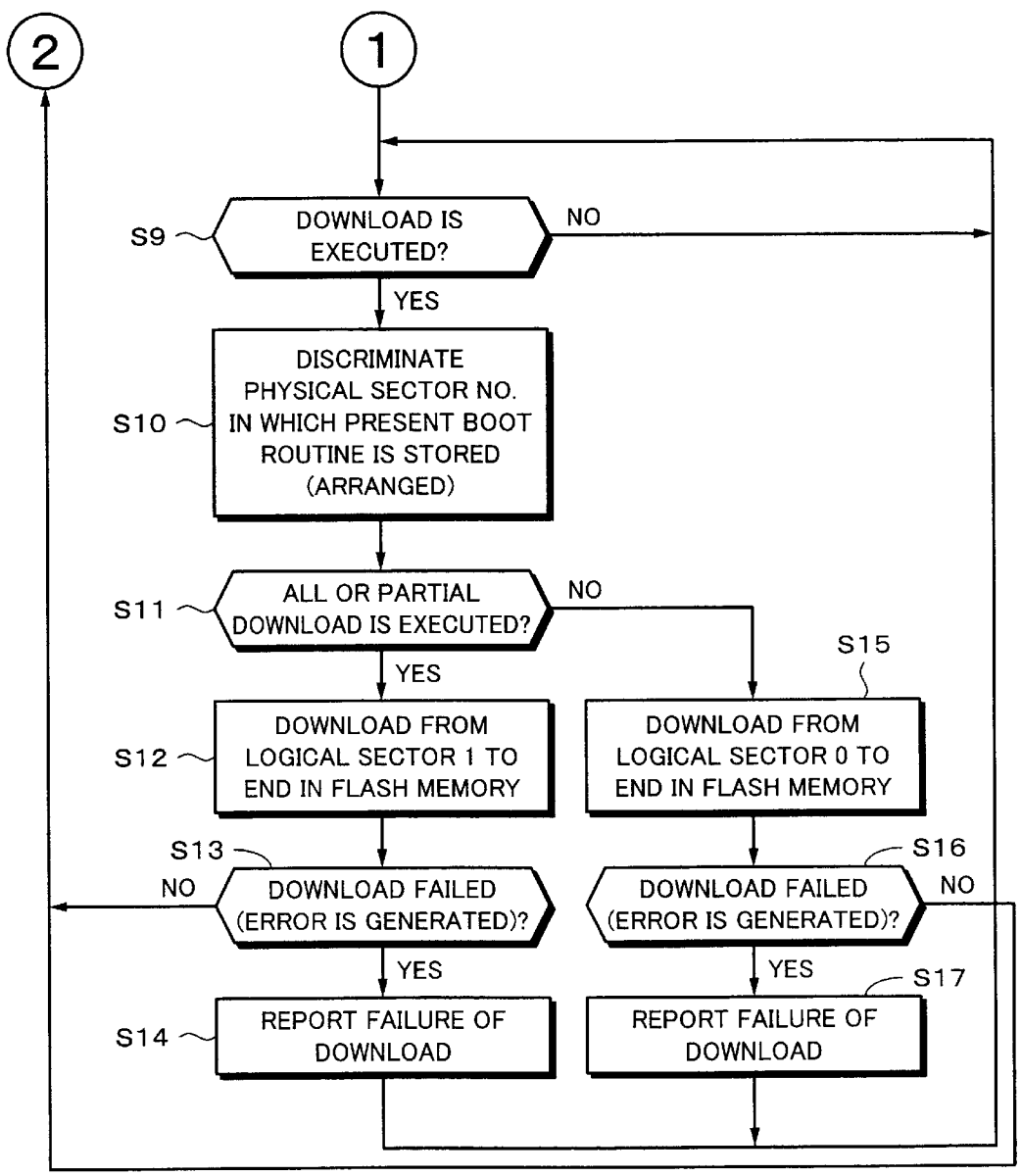
FIG. 5 is a continuation of the flowchart of FIG. 4 with respect to the operation of the information processing apparatus of FIG. 1.
Figure 6:
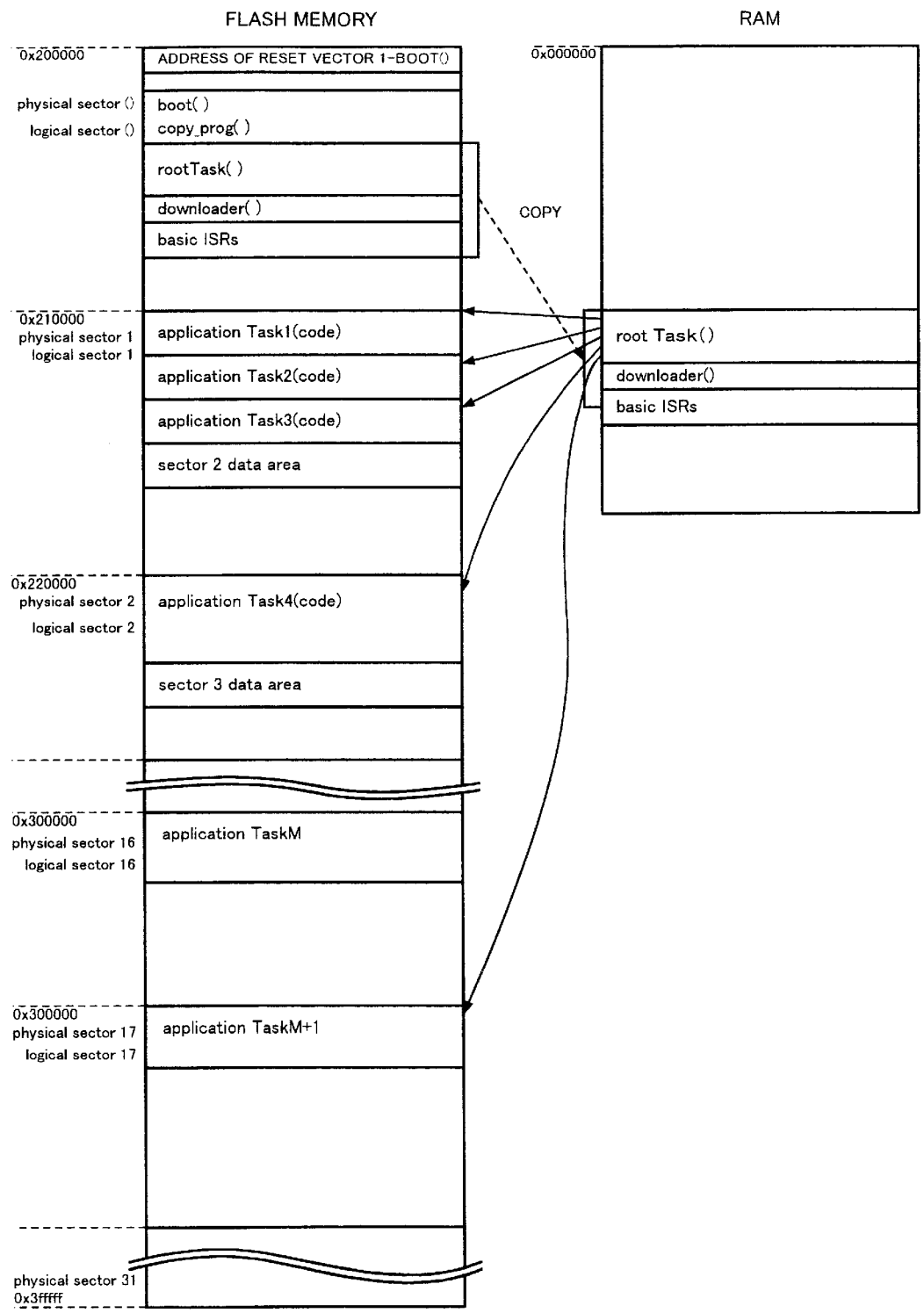
FIG. 6 is a diagram showing an example of a memory map in accordance with an embodiment of the invention.

In step S1, as shown in FIG. 4, when the power source is turned on, a boot of the system occurs. As shown in FIG. 6, the CPU 1 refers to a reset vector stored at the head of the logical sector 0 of the flash memory 4 in which the basic program has been stored and executes a boot routine (boot( ) in the diagram) stored in the address shown by its value. In this instance, when an error occurs, the abovementioned process for the reactivation is executed.

In step S2 (FIG. 4), the CPU 1 executes a copy routine (copy_prog( ) in FIG. 6), reads out a root task routine (rootTask( ) in FIG. 6) for managing the download or executing an application task, a download routine (downloader( ) in FIG. 6) for downloading a new program from the peripheral apparatus 11, and a service routine (basic ISRs in FIG. 6) for executing an interrupting process from the logical sector 0, and allows them to be stored into the RAM 5.

In step S3, the CPU 1 starts the execution of the root task routine in the RAM S. The processes in step S3 and subsequent steps are executed in accordance with the root task routine.

As mentioned above, the CPU 1 allows the routines such as a root task routine and the like stored in the logical sector 0 to be stored into the RAM 5 and, after that, executes the routines stored in the RAM 5, so that the logical sector 0 in the flash memory 4 can be rewritten. Even when a bus error, an address error, an illegal command, or the like occurs during the execution of the program, an "exceptional process" can be executed by storing the service routine, which executes an interrupting process into the RAM 5, so that a download of a proper program can be executed after completion of the exceptional process.

In step S4, the CPU 1 inquires of the peripheral apparatus 11 (or system monitoring circuit 7) about whether the preceding download of the program from the peripheral apparatus 11 has failed or not. When it is determined that the preceding download is successful, the processing routine advances to step S5 and all of the logical sectors are checked. When checking the logical sectors, it is desired to sequentially check the logical sectors from the logical sector 16 serving as a rewriting start sector of the downloaded program to the logical sector 32 and, after that, sequentially check the logical sectors from the logical sector 0 to the logical sector 15. Even when the download is never executed until this time point after the power-on, the processing routine advances to step S5.

In step S6, the CPU 1 discriminates whether an abnormality has been found in all of the logical sectors or not. When it is decided that no abnormality is found, the processing routine advances to step S7, the application tasks (application program)(applicationTask1( ), applicationTask2( ), . . . , in FIG. 6) are sequentially started as a multi-task, after that, the processing routine advances to step S9 (FIG. 5), and the CPU 1 waits until the download is executed.

For example, a program version register or a register for check sum is assured in a predetermined memory area in the flash memory 4, a version of the program and a value of the check sum are previously stored upon writing of the program and those values are referred in step S6, so that the CPU 1 can discriminate whether each logical sector is abnormal or not. Even when information relating to the result (success or failure) of the download is not stored, the peripheral apparatus 11 can determine whether the preceding download has been successful or not by checking the predetermined logical sector as mentioned above.

On the other hand, when the CPU 1 decides that an abnormality was found in step S6, the processing routine advances to step S8. In step S8, the CPU 1 discriminates whether the logical sector 16 is abnormal or not and when the logical sector 16 is abnormal, the CPU 1 determines that the writing of the boot sector failed in the preceding all download (not a partial download), outputs a request to download (all download) a new program corresponding to all of the logical sectors to the peripheral apparatus 11. After that, the processing routine advances to step S9 (FIG. 5) and the CPU 1 waits until the download is executed. When the logical sector 16 is normal, the processing routine advances to step S9 without executing the process of step S8.

In step 54, when it is decided that the preceding. download failed (even if the application task is executed, since a possibility such that the bus error, address error, illegal, command, or the like occurs is strong), the processing routine advances to step S9 (FIG. 5) and the CPU 1 waits until the next download is executed.

The CPU 1 waits until the next download is executed, as determined in step S9. When the download is started by the peripheral apparatus 11, first in step S10, the CPU 1 specifies the sector (boot sector) in which the boot routine has been arranged, namely, the number of the physical sector corresponding to the logical sector 0 (in this case, 0 or 16) from, for example, final boot sector information stored in the non-volatile memory 31.

When the application program is operated in a multi-task environment, execution of the root task (having a rewriting program) is maintained at this time point and the execution of all of the other tasks is stopped.

In step S11, the CPU 1 discriminates whether the kind of download to be executed is the all download or a partial download wherein the programs (namely, the application program) of the sectors except for the boot sector are downloaded by a predetermined signal from the peripheral apparatus 11. When the download is the partial download, the processing routine advances to step S12 and the CPU 1 allows the program supplied from the peripheral apparatus 11 to be stored into the area in a range from the logical sector 1 to the final logical sector.

As shown in FIG. 6, the partial download can be executed by storing the application tasks and data corresponding to them into the sectors different from that of the basic program such as a boot routine and the like. In the partial download, since the basic program is not rewritten, data is protected. Therefore, even if an accident occurs during the download, the partial download can be executed again by using such a construction.

In this instance, when the boot sector is arranged in only the physical sector 0 and the activation is executed by the basic program stored in it, the program is overwritten onto the area from the physical sector 1 to the final physical sector (physical sector N−1).

On the other hand, there may be a case where although the system is activated by the basic program stored in the physical sector 0 at present, the other boot sector is arranged in the physical sector 16. Although the all download was executed at the preceding activation and the download has been normally executed up to the boot sector, if the download of the application program fails, such a state is caused. As a countermeasure in this case, there may be a case where the boot sector of the physical sector 0 remains and the partial download is performed to the other portions and a case where the boot sector of the physical sector 16 remains and the partial download is performed to the other portions. As for the selection of either one of the two cases, for example, it is also possible to compare the version information of the boot sectors stored in the physical sectors 0 and 16 and to leave the new one. It is also possible to leave the boot sector associated with the application program to be partially downloaded.

In step S13 (FIG. 5), the CPU 1 discriminates whether this download failed or not. When the download is successful, the processing routine is returned to step S1 (FIG. 4) and the system is booted again (reactivation is executed).

On the other hand, when it is decided in step S13 that the download failed, the CPU 1 allows information of the failure of the download to be stored into the built-in memory. Further in step S14, the CPU 1 reports the failure of the download to the peripheral apparatus 11 by outputting a predetermined signal. After that, the processing routine is returned to step S9 and the CPU 1 waits until the download is executed again.

When it is determined in step S11 that the present download is the all download, the processing routine advances to step S15 and the CPU 1 allows the program supplied from the peripheral apparatus 11 to be stored. That is, the boot sector is written into the logical sector 16 and data of the logical sector 1 is written into the logical sector 17. In this manner, data is sequentially written. The sector is returned to the logical sector 1 and data is written into the areas up to the logical sector 15.

Figure 7:
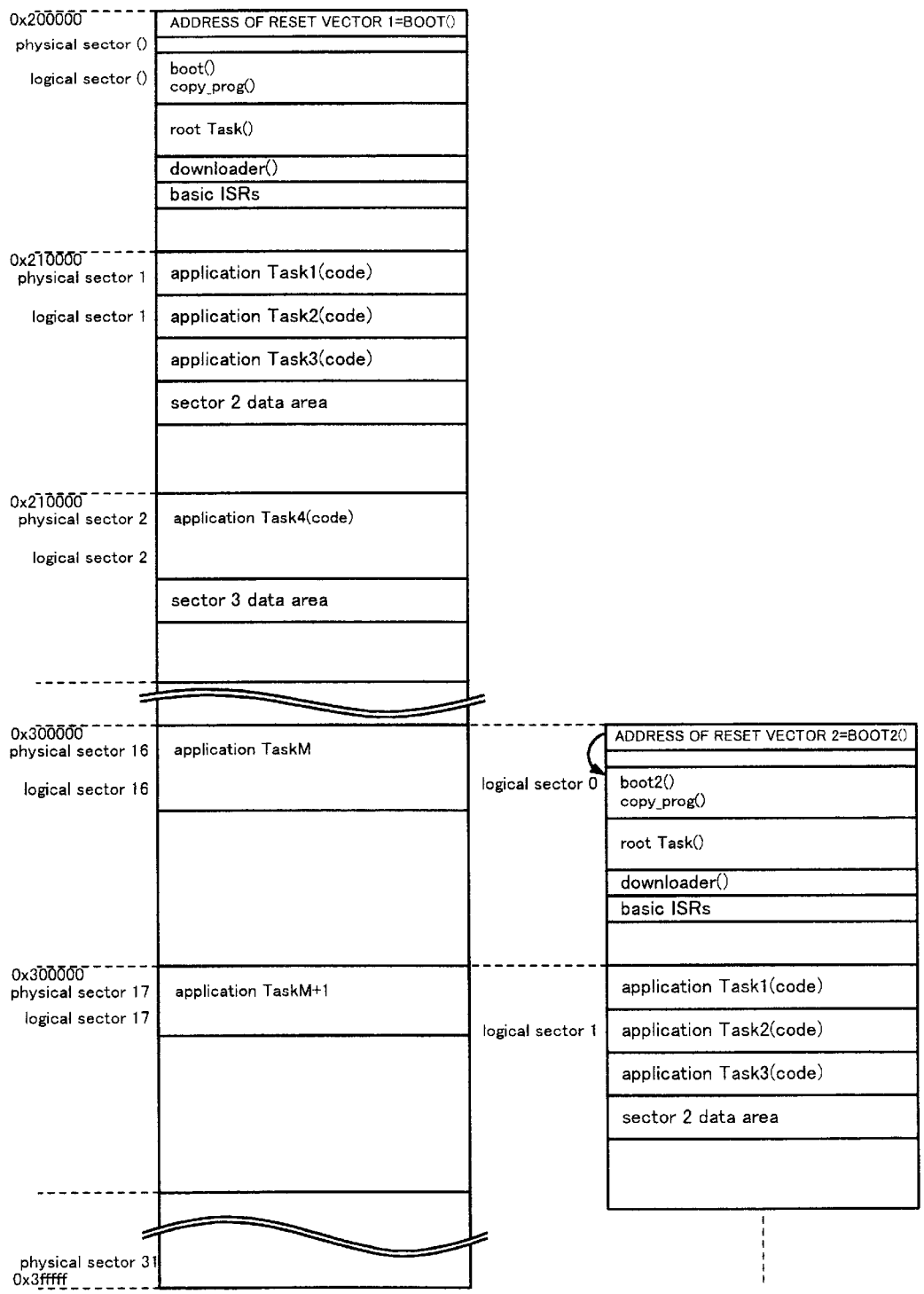
FIG. 7 is a diagram showing another example of a memory map in accordance with an embodiment of the invention.

As shown in FIG. 7, the addressing of the flash memory 4 is performed by, for example, 32 bits. In case of using the value of the $21^{st}$ bit of the address information for the switching control of the boot sector, when the CPU 1 addresses the head (0x 200000 ("0 x" indicates the hexadecimal number)) of the logical sector 0, the head (0 x 200000) of the physical sector 0 is addressed so long as the value of the address signal is equal to 0. On the other hand, when the value of the address signal is equal to 1, the head (0 x 300000) of the physical sector 16 is addressed.

Therefore, when the boot sector is arranged in the physical sector 0, as shown in FIG. 7, the program is sequentially written into the physical sectors from sector 16 to the end sector (physical sector N−1) and the physical sectors 0 to 15 in accordance with the order of the logical sector numbers. Therefore, the physical sector number corresponding to a predetermined logical sector number at this time is shown by the remainder ((logical sector No. +16) (mod N)) of the sector number N for the number obtained by adding 16 to the logical sector number.

When the boot sector is arranged in the physical sector 16, the program is sequentially written into the physical sectors from the sector 0 to the end sector (physical sector N−1) in accordance with the order of the logical sector numbers. Therefore the number of each physical sector after completion of the writing is the same number as that of the logical sector corresponding to the physical sector.

That is, when the original boot sector is arranged in the physical sector 0, the boot sector is arranged in the physical sector 16 by the present download. When the original boot sector is arranged in the physical sector 16, the present boot sector is arranged in the physical sector 0. As mentioned above, by preventing the program of the present boot sector from being written before a new program is overwritten into the original boot sector, even when an error occurs during the download of the program, at least one normal boot sector is preserved.

In step S16 (FIG. 5), the CPU 1 discriminates whether the download has failed or not. When the download is successful, the processing routine is returned to step S1 (FIG. 4) and the system is booted again (reactivation is executed).

When it is decided in step S16 that the download failed, the CPU 1 allows the information of the failure of the download to be stored into the built-in memory. Further in step S17, the failure is reported to the system monitoring circuit 7 and peripheral apparatus 11 and, the processing routine is returned to step S9 and the CPU 1 waits until the download is executed again.

In this manner, when the all download or partial download is executed as necessary and the download does fail, a predetermined application task is executed after completion of the boot.

Figure 8:
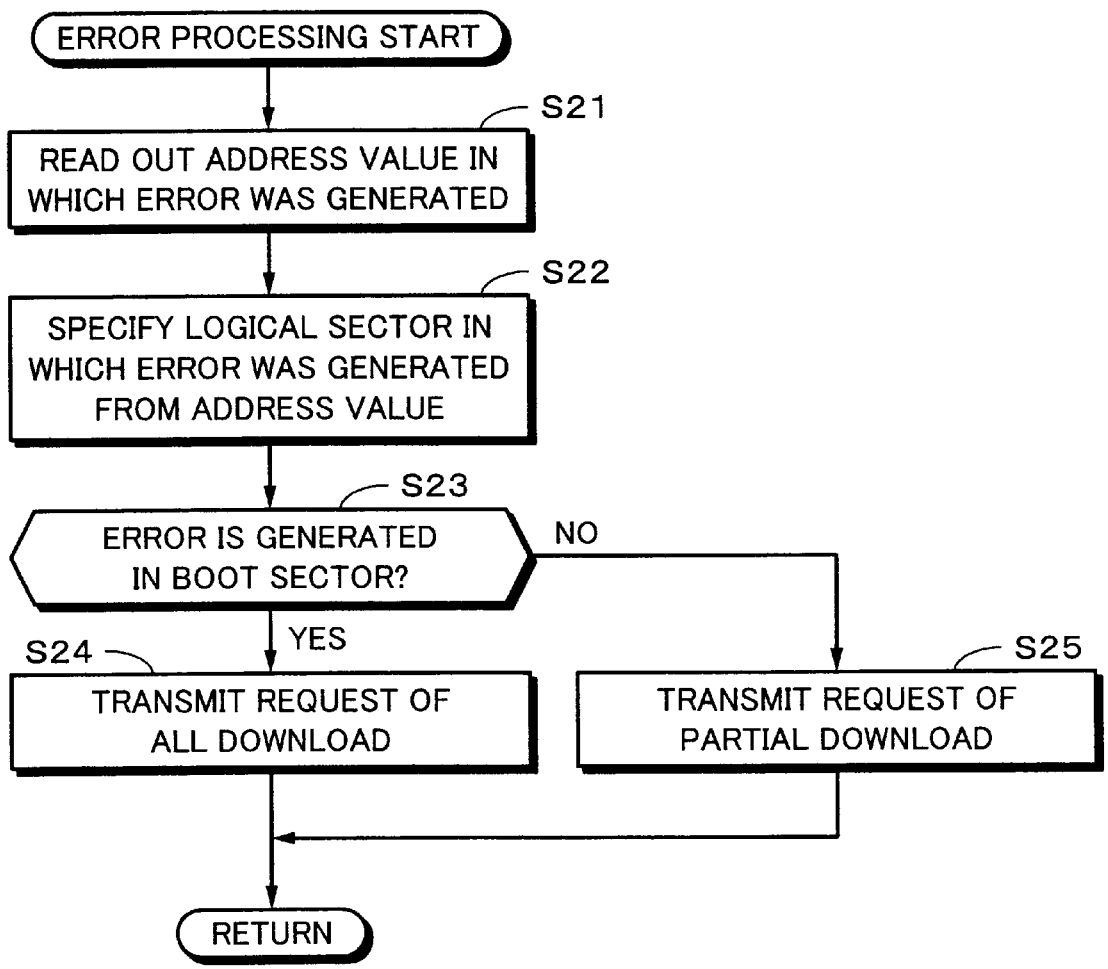
FIG. 8 is a flowchart of the operation of an exceptional process of the information processing apparatus of FIG. 1.

An exceptional process when a bus error, an address error, an illegal command, or the like occurs will now be explained by referring to a flowchart of FIG. 8. In above-mentioned step S5 (FIG. 4), when an error occurs due to a check omission in spite of a fact that all of the logical sectors were checked, the following exceptional process is executed.

First in step S21, the CPU 1 reads out the address in which the error occurred and, in step S22, specifies the logical sector in which the error occurred from its address value.

In step S23, the CPU 1 discriminates whether the error is generated in a logical sector which is the boot sector (namely, logical sector 0) or not. When the logical sector is the boot sector the CPU 1 transmits a request for the all download to the peripheral apparatus 11 in step S24. When the sector is a sector except for the boot sector, the CPU 1 transmits a request for the partial download in step S25.

By executing the exceptional process as mentioned above, for example, even when the power failure occurs during the download and the failure of the download is not reported to the peripheral apparatus 11 and, further, a check omission occurs at the time of checking of the logical sectors, the download can be executed again.

In the embodiment, although the number of the physical sector to which the boot sector is arranged is set to 0 or 16, the boot sector can be also arranged in the other physical sector.

In the embodiment, although the basic program has been stored in the RAM 5, it is also possible that the logical sectors 16 to (N−1) are rewritten by a program rewriting module (downloader () in FIG. 6) stored in the boot sector (logical sector 0) in the flash memory 4 and, as for the rewriting of the logical sectors 0 to 15, the execution is shifted to a program rewriting module which is newly supplied and all of the programs are rewritten. Therefore, it is unnecessary to store the basic program into the RAM 5.

In this case, an address into which the program rewriting module (downloader( )) which is newly supplied is stored is previously supplied as data to the original program rewriting module. After a new basic program was written into the logical sector 0 in accordance with the original program rewriting module the CPU 1 shifts the execution of the program to the new program rewriting module in the new logical sector 0 and writes the remaining program subsequent to the logical sector 0 into the flash memory 4 in accordance with the new program rewriting module.

As mentioned above, according to the invention, the new basic program is stored into a predetermined area in the second memory area in which the original application program has been stored and, after that, the new application program is stored in a range from the end of the area in which the new basic program has been stored to the end of the second memory area, and from the area in a range from the head of the second memory area to the head of the area in which the new basic program has been stored. Consequently, a capacity of the rewritable non-volatile memory can be reduced.

What is claimed is:

1. A system for executing a boot routine comprising:
   (a) a central processing unit (CPU) for identifying an address; and
   (b) an external memory having boot routines at different memory addresses, a first portion of each memory address being defined by the CPU and a second portion of each memory address being defined by a system monitoring circuit;
   wherein the system monitoring circuit includes:
      a circuit providing an error signal indicative of whether the CPU is executing, in a normal manner, a routine at the address identified by the CPU,
      a boot memory storing a boot control value such that the boot memory retains the boot control value if the CPU is reset, and
      a logic circuit providing a value for the second portion of each memory address, the value being dependent upon the error signal, the boot control value, and a second portion of the address identified by the CPU;
   whereby (i) if the CPU executes the boot routine at the identified address in a normal manner, then the system monitoring circuit sets the value of the second portion of a memory address to the second portion of the address identified by the CPU, and (ii) if the CPU does not execute the boot routine at the identified address in a normal manner, then the system monitoring circuit changes the value stored in the boot memory, resets the CPU, and sets the value of the second portion of a memory address such that another boot routine at an address different from the identified address is executed by the CPU.

2. The system of claim 1 further comprising a reset generator for resetting the CPU if the error signal indicates that the CPU is not executing in a normal manner.

3. The system of claim 1 wherein the boot memory is non-volatile.

4. The system of claim 1 further including a download routine buffer for receiving a boot program.

5. The system of claim 1 wherein the logic circuit includes a first logic circuit that inverts the boot control value dependent upon whether the error signal indicates that the CPU is not executing in a normal manner.

6. The system of claim 5 wherein the logic circuit includes a second logic circuit that inverts the second portion of the address identified by the CPU dependent upon the output of the first logic circuit.

7. The system of claim 6 wherein the first logic circuit and second logic circuit each comprises an XOR gate.

8. A method of a central processing unit (CPU) executing a boot routine comprising:
   (a) providing a memory having a first boot-routine at a first address,
   (b) downloading a second boot routine into the memory at a second address,
   (c) using the CPU to attempt to execute the second boot routine by identifying the second address,
   (d) if the second boot routine is not executed by the CPU in a normal manner, then:
      (1) generating an error signal,
      (2) changing a value stored in a non-volatile memory in response to the error signal,
      (3) resetting the CPU such that the stored value in the non-volatile memory does not change and the CPU identifies the second address again, and
      (4) before providing the second address to the memory, changing a portion of the second address identified by the CPU depending upon whether the error signal is present and depending upon the changed value stored in the non-volatile memory, such that the changed second address is equivalent to the first address.

9. The method of claim 8 wherein the step of changing a portion of the second address is performed by a system monitoring circuit in communication with the CPU memory.

* * * * *

UNITED STATES PATENT AND TRADEMARK OFFICE
CERTIFICATE OF CORRECTION

PATENT NO.    : 6,539,474 B2
DATED         : March 25, 2003
INVENTOR(S)   : Yoko Matsuura It is certified that error appears in the above-identified patent and that said Letters Patent is hereby corrected as shown below:

Column 2,
Line 62, delete ",".

Column 3,
Line 42, delete "1", first occurrence.

Column 5,
Line 59, delete "S" and insert -- 5 --.

Column 6,
Line 54, delete "5" and insert -- S --.

Column 9,
Line 56, between "a" and "routine" insert -- boot --.

Column 10,
Line 22, delete "routine" and insert -- program -- and delete "program" and insert -- routine --.
Line 35, delete "-" between "boot" and "routine".

Signed and Sealed this

Twelfth Day of August, 2003

JAMES E. ROGAN
*Director of the United States Patent and Trademark Office*